Oct. 4, 1960   R. L. LICH   2,954,745
RAILWAY VEHICLE STRUCTURE
Filed July 29, 1955   7 Sheets-Sheet 1
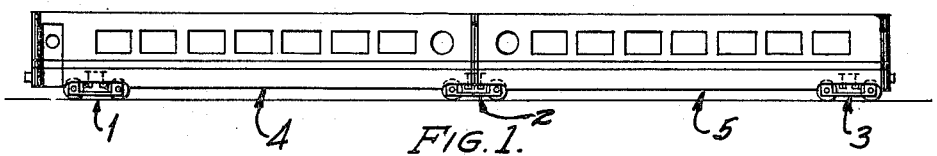
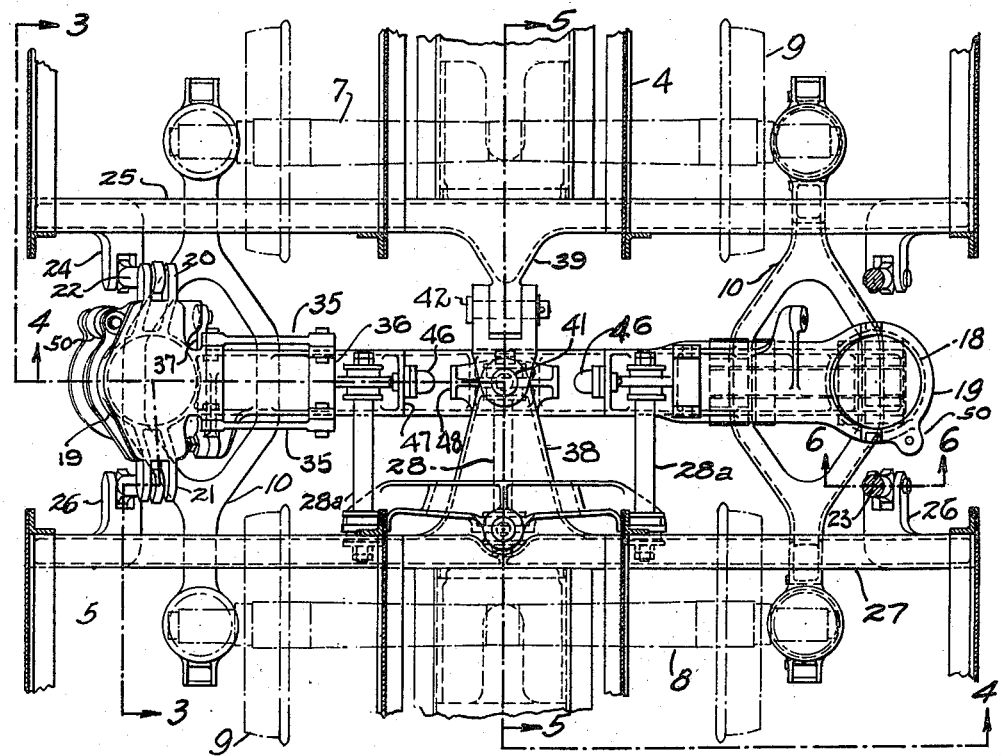
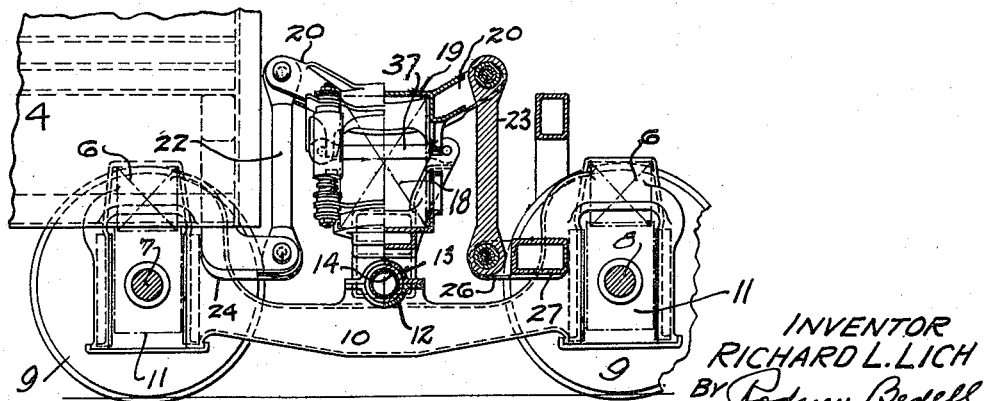
INVENTOR
RICHARD L. LICH
By Rodney Bedell
ATTORNEY Oct. 4, 1960 R. L. LICH 2,954,745
RAILWAY VEHICLE STRUCTURE
Filed July 29, 1955 7 Sheets-Sheet 2
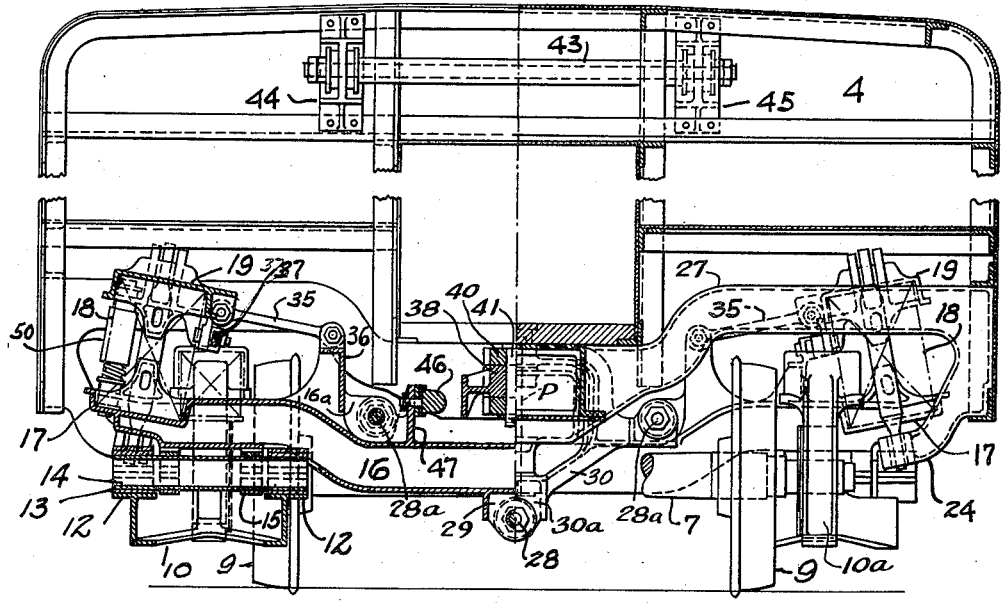
FIG. 4.
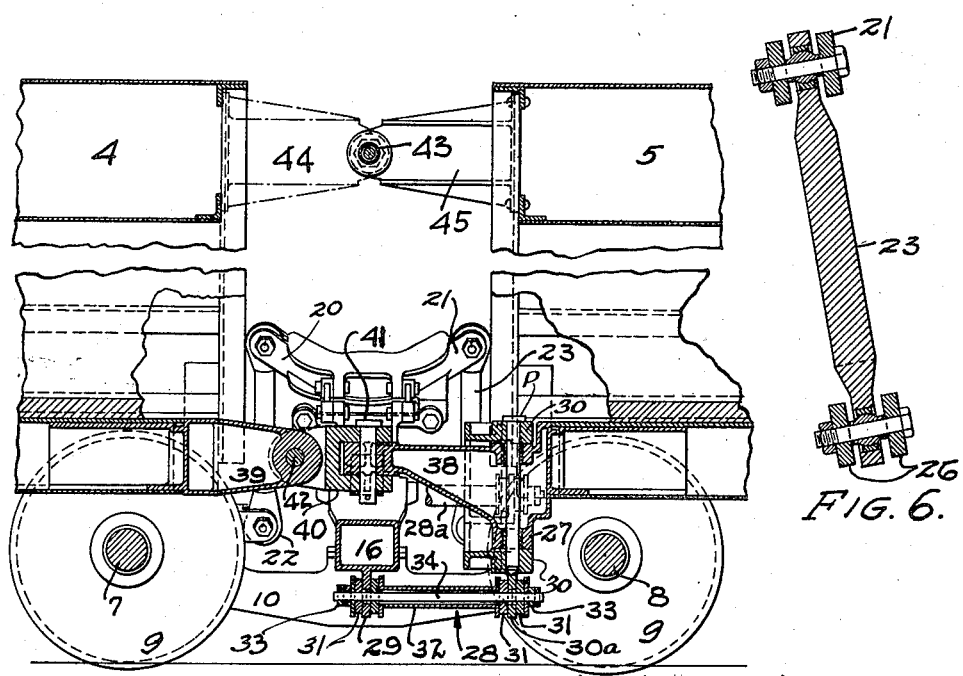
FIG. 5.
FIG. 6.
INVENTOR
RICHARD L. LICH
BY Rodney Bedell
ATTORNEY.

Oct. 4, 1960  R. L. LICH  2,954,745
RAILWAY VEHICLE STRUCTURE
Filed July 29, 1955  7 Sheets-Sheet 3

INVENTOR
RICHARD L. LICH
BY Rodney Bedell
ATTORNEY

Oct. 4, 1960  R. L. LICH  2,954,745
RAILWAY VEHICLE STRUCTURE
Filed July 29, 1955  7 Sheets-Sheet 5

INVENTOR
RICHARD L. LICH
BY Rodney Bedell
ATTORNEY

Oct. 4, 1960 R. L. LICH 2,954,745
RAILWAY VEHICLE STRUCTURE
Filed July 29, 1955 7 Sheets-Sheet 7

INVENTOR
RICHARD L. LICH
BY Rodney Bedell
ATTORNEY

United States Patent Office 2,954,745
Patented Oct. 4, 1960

2,954,745

RAILWAY VEHICLE STRUCTURE

Richard L. Lich, St. Louis, Mo., assignor to General Steel Castings Corporation, Granite City, Ill., a corporation of Delaware Filed July 29, 1955, Ser. No. 525,324

32 Claims. (Cl. 105—4)

The invention relates to railway rolling stock and more particularly to a novel truck construction and associated car body framing and the connections between the same. The main object of the invention is to adapt a truck and body assembly for a car with a longitudinal center portion positioned substantially below the level of the usual car body central portion and particularly to provide such a structure in passenger car trucks where easy riding qualities, including regulated soft spring action, lateral motion of the car body relative to the truck, and stability against transverse tilting are important.

Other objects will appear from the detail description of the selected embodiments of the invention shown in the accompanying drawings, in which:

Figure 1 is a side elevation, substantially diagrammatic, illustrating a pair of car bodies arranged end to end with their adjacent ends mounted upon a common four wheel truck and their remote ends mounted on individual four wheel trucks, it being understood that the truck and body assembly incorporate features of the present invention.

Figure 2 is a top view of the four wheel truck shown intermediate the ends of Figure 1 with portions of the supported car bodies indicated partly in section.

Figure 3 is a side elevation and longitudinal vertical section on the line 3—3 of Figure 2.

Figure 4 is a vertical transverse section and elevation on the line 4—4 of Figure 2.

Figure 5 is a vertical longitudinal central section on the line 5—5 of Figure 2.

Figure 6 is a detail section through a swing hanger suspension link on the line 6—6 of Figure 2.

Figure 7:
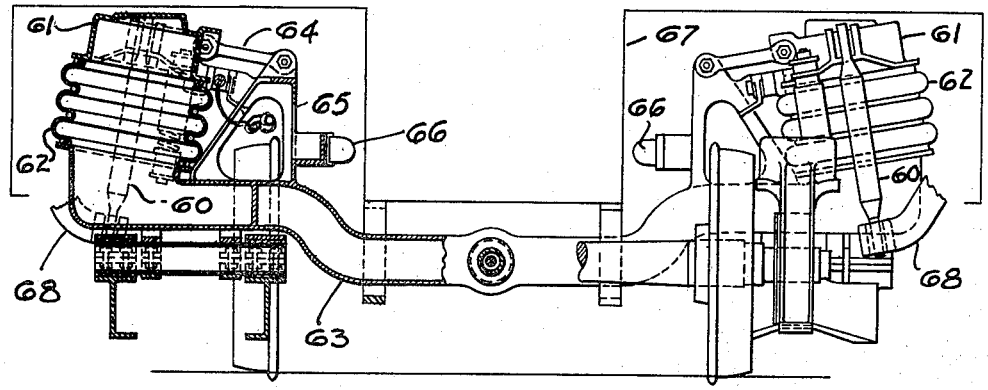

Figure 7 corresponds generally to Figure 4 but illustrates a second form of the invention.

Figure 8:
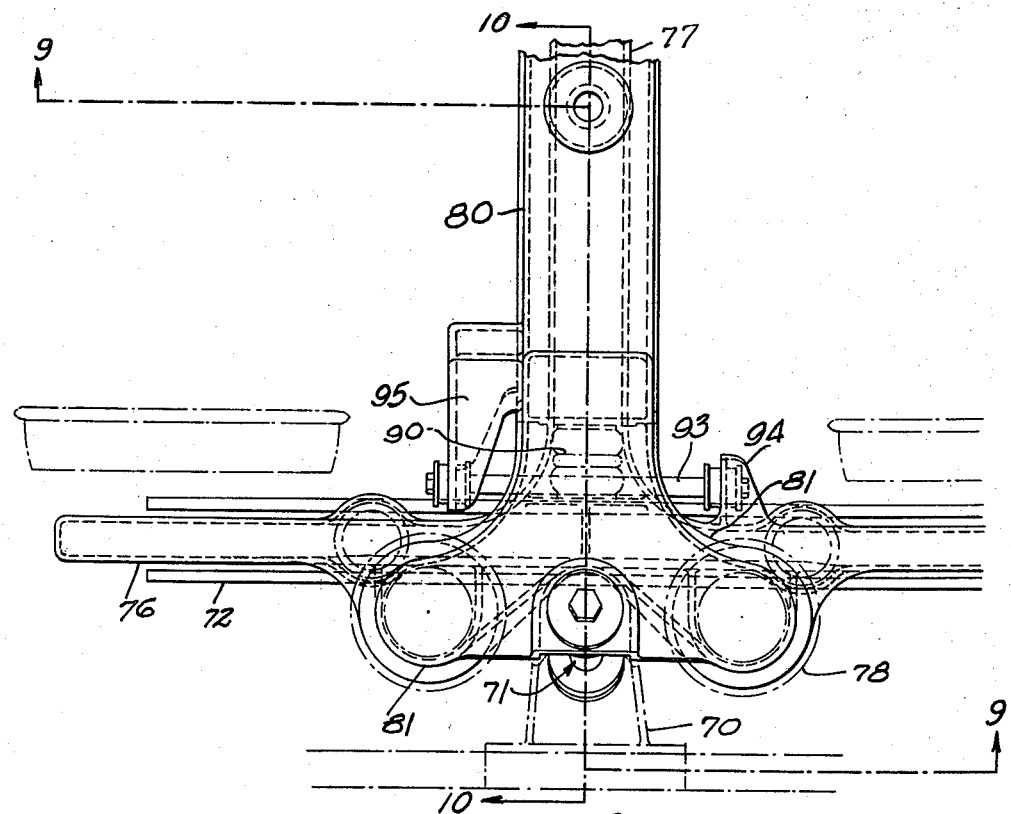

Figure 8 is a top view of one longitudinal half of a truck corresponding generally to the trucks previously described but illustrating a third form of the invention.

Figure 9:
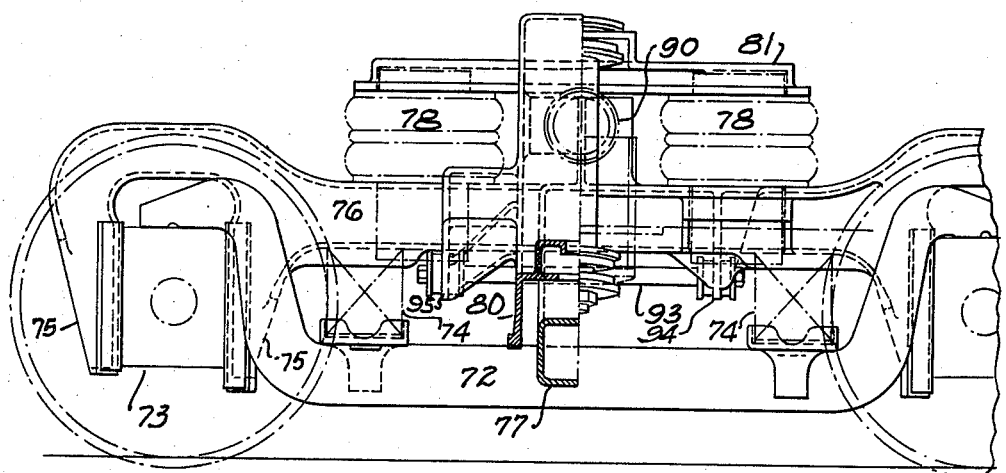

Figure 9 is in part a side elevation and in part a vertical longitudinal section on the line 9—9 of Figure 8.

Figure 10:
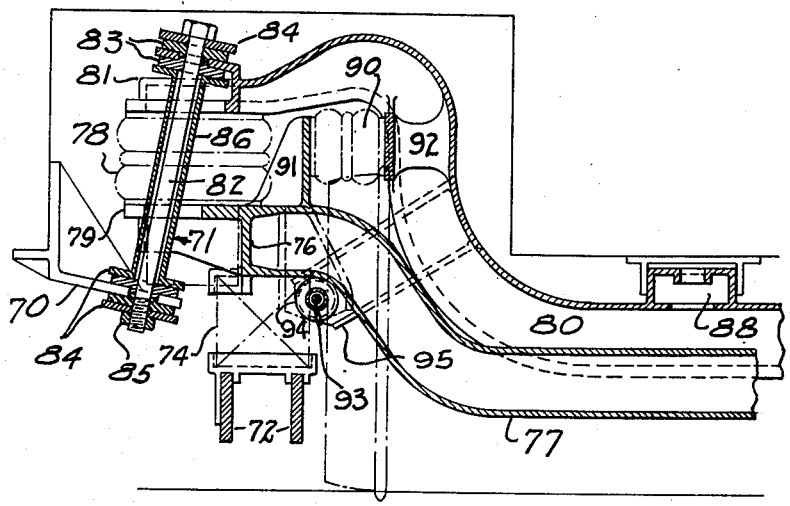

Figure 10 is a vertical transverse section on the line 10—10 of Figure 8.

Figre 11 corresponds generally to Figure 8 but shows a fourth form of the invention including adjacent portions of the supported car bodies.

Figure 11:
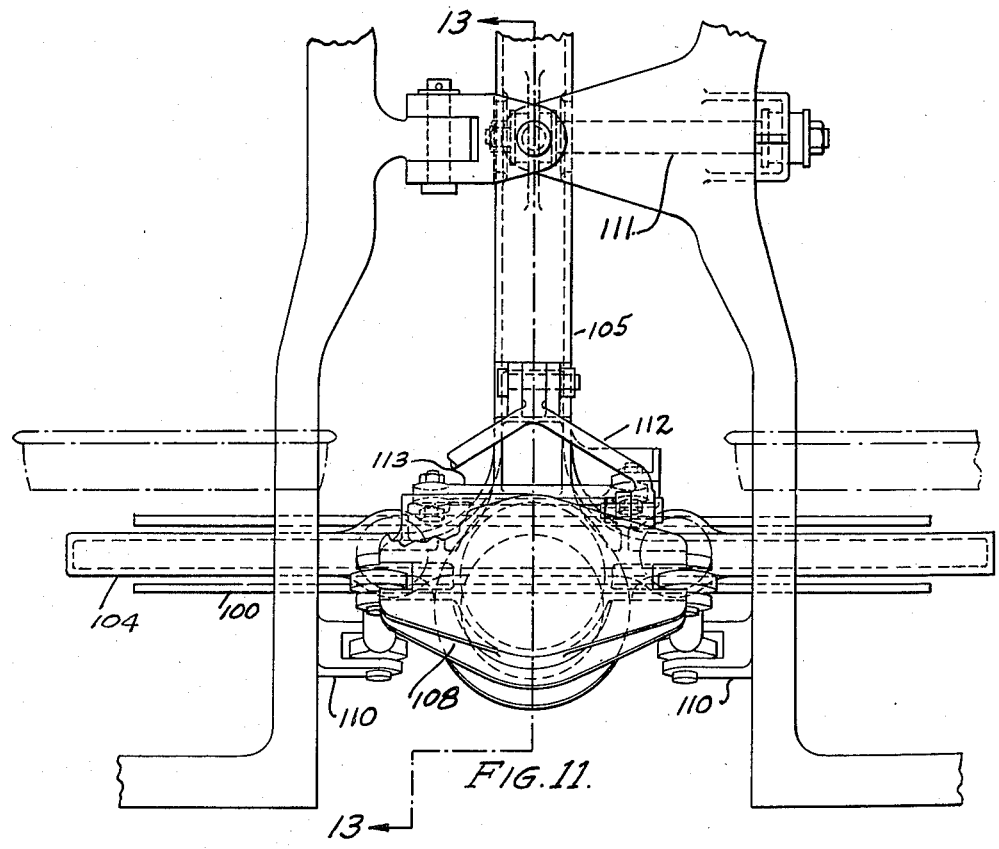
Figure 12:
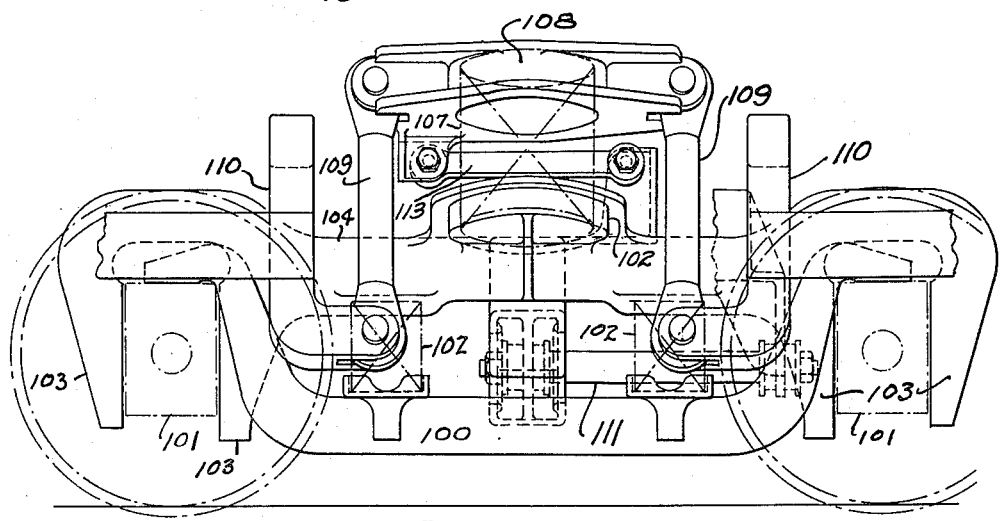

Figure 12 is a side elevation of the structure shown in Figure 11.

Figure 13:
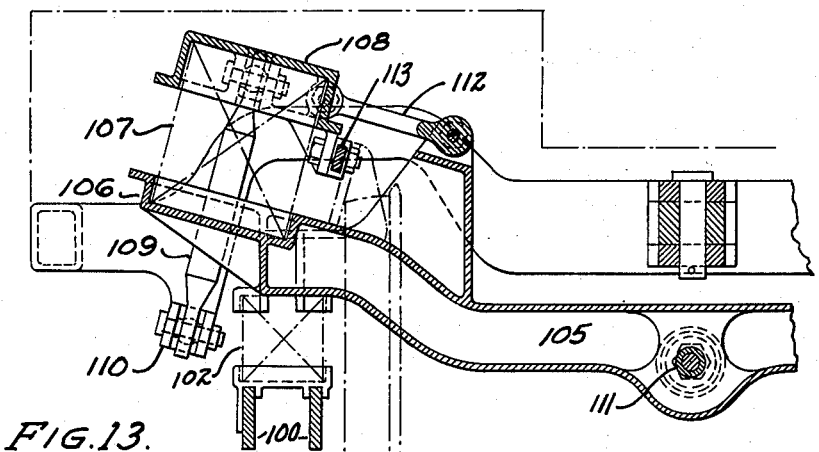

Figure 13 is a vertical transverse section on the line 13—13 of Figure 11.

Figure 14:
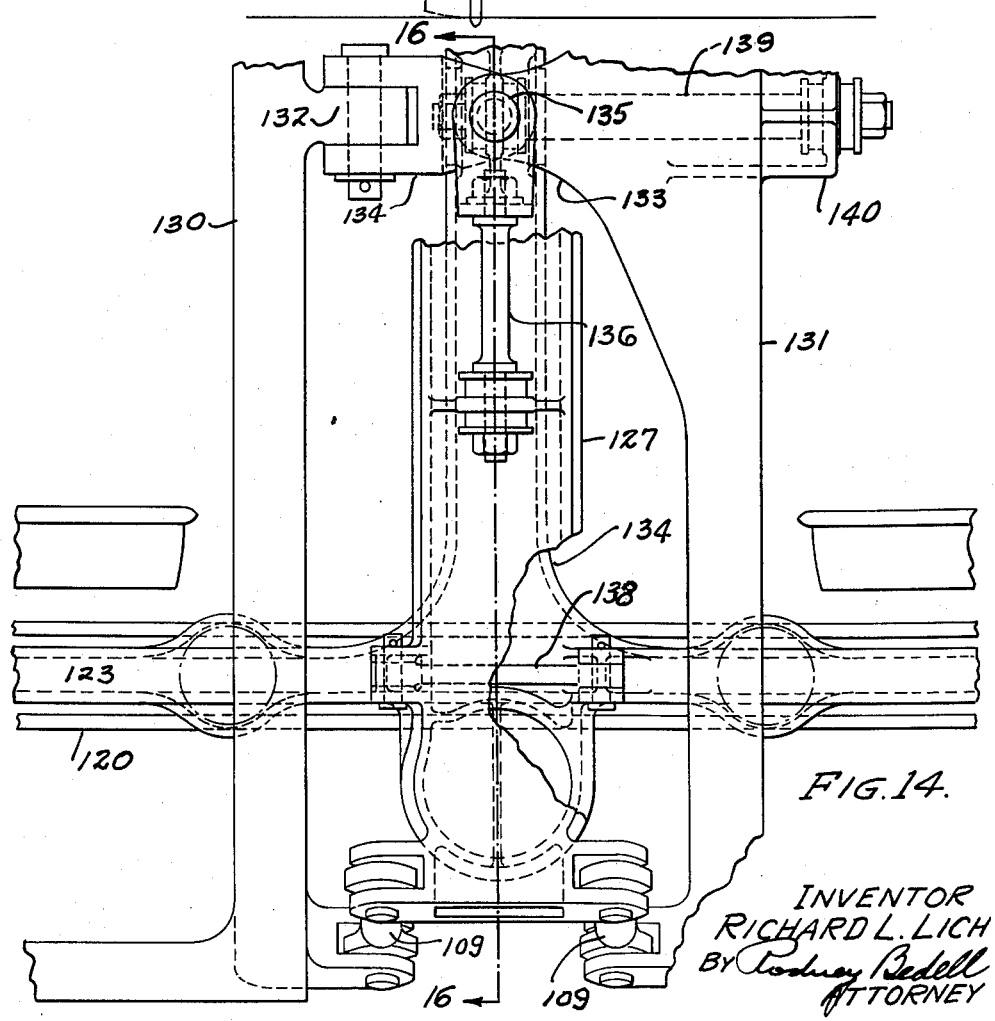

Figure 14 corresponds to Figure 11 but illustrates a fifth form of the invention.

Figure 15:
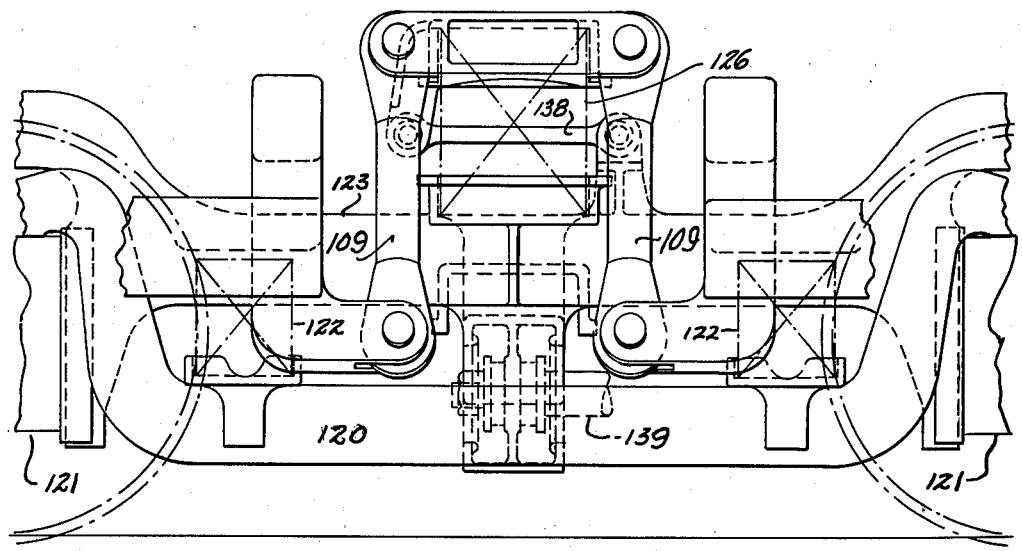

Figure 15 is a side elevation of the structure shown in Figure 14.

Figure 16:
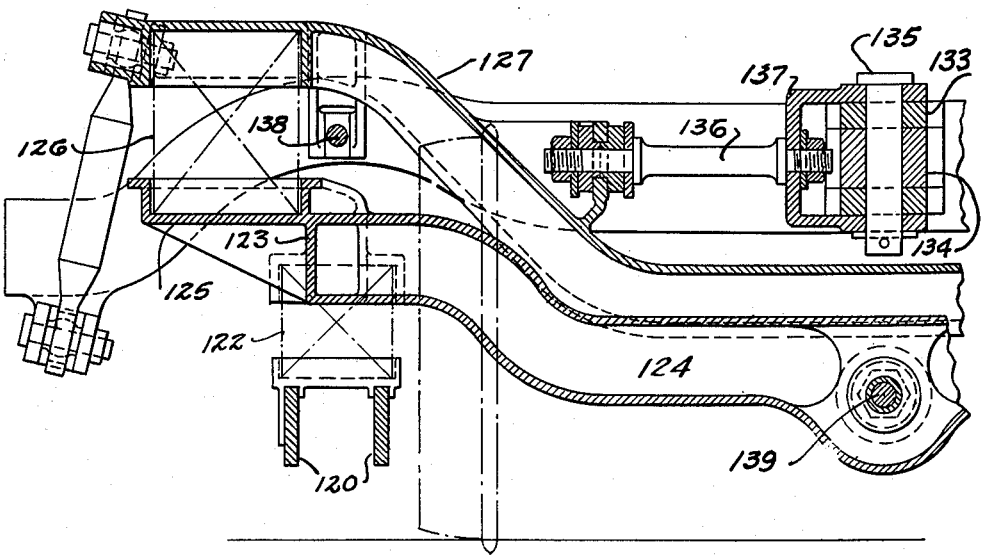

Figure 16 is a vertical transverse section on the line 16—16 of Figure 14.

In Figure 1 the trucks 1, 2, and 3 are alike and are interchangeable and support the car bodies 4 and 5, as shown. Each truck may consist of any one of the five forms illustrated in the drawings and described below.

The truck in the first form of the invention, shown in Figures 2–6, comprises a pair of axles 7, 8, each provided with wheels 9. Side frames 10 have pedestals 10a slidably receiving between them the boxes 11 mounted on the axle journals in the usual manner and holding the axles in spaced relation. Preferably springs 6 support the side frames on the boxes, but these springs may be omitted and the frames and journal boxes be made rigid or integral if the additional springing and equalization is not required. Each side frame has a central portion, diamond-shaped in plan view, with cylindrical bearings 12 (Figure 4) aligned transversely of the truck and provided with bonded rubber bushings 13 surrounding a tubular member 14 affixed to bearings 15 on a spring plank 16 extending transversely of the truck and terminating in spring seats 17. Elements 12, 13, 14, 15 form a torsional spring support for the spring plank. Coil springs 18 mounted on seats 17 have their axes inclined upwardly and inwardly and at their upper ends support caps 19. Each cap has brackets 20 and 21 at its ends for suspending individual hangers 22, 23, respectively. The lower end of each hanger 22, 23 is pivotally connected to the car body.

Referring to center truck 2, hangers 22 are connected to the lower end of brackets 24 projecting from the lower transverse member 25 of the underframe of car body 4. Hangers 23 are pivotally connected at their lower ends to similar brackets 26 projecting from the lower end member 27 on the underframe of car body 5. The hanger and bracket assembly includes universal joint connections between the hangers and brackets (Figure 6) so that the hangers may swing longitudinally and transversely of the truck, except as limited by the following elements, to accommodate forces to shift the car bodies transversely of the truck.

A central longitudinal anchor 28 (Figures 4 and 5) is connected at one end to a flange 29, depending from spring plank 16, and at its other end to a flange 30a depending from a yoke 30 pivoted at P to the end member 27 of the underframe of car body 5. Two side longitudinal anchors 28a are connected to yoke 30 and to upstanding flanges 16a on spring plank 16. Each anchor 28 and 28a is of a type commonly used in railway truck construction, whereby interconnected vehicle parts have flanges such as 29 and 30a gripped by rubber pads 31 positioned between a tubular strut 32 and nuts 33 on the ends of a central bolt 34. Yoke 30 and anchors 28, 28a hold the spring plank against tilting from the vertical about its longitudinal axis extending transversely of the truck but accommodate movement of the car bodies relative to the spring plank and other truck parts transversely of the truck as must occur on curved track.

Links 35 extending transversely of the truck are connected at their opposite ends to spring caps 19 and to upstanding brackets 36 on spring plank 16. Links 37 extending longitudinally of the truck are connected at their opposite ends to spring caps 19 and to brackets on the spring plank 16. These links hold the spring caps and coil springs against movement transversely and longitudinally of the truck while accommodating the vertical movements of the springs and their caps and hangers and supported body loads.

A coupling tongue 38 projects from underframe cross member 27 on car body 5 between the upper and lower members of yoke 30. A corresponding coupling tongue 39 projects from underframe cross member 25 on car body 4. Tongue 38 is received between horizontal forks of a clevis 40 and is connected thereto by a vertical pin 41. Tongue 39 is received between upright forks of clevis 40 and is connected thereto by a horizontal pin 42. Rubber bumpers 46 project laterally from upstanding flanges 47 on spring plank 16 and oppose pads 48 on coupling tongue 38.

The upper ends of the car bodies are coupled by an anchor 43 (Figures 4, 5) extending transversely of the cars and constructed similarly to the anchors 28, 28a, previously described, with one end connected to bracket 44 on the framing of car body 4 and the other end connected to bracket 45 on the framing of car body 5. Anchor 43 holds the upper portions of the car bodies against substantial relative movement transversely of each other, but by the yielding of its rubber pads accommodates the inclination of the cars on curved track and the tilting of the cars due to uneven track conditions.

With this construction, the weight of the car body and its load is directly suspended from springs 18 positioned at the sides of the truck and mounted on a beam (spring plank 16) which is supported at spaced points 12 at opposite sides of the longitudinal upright plane passing through the axle journal bearing centers. The pivotal support 14 of the spring plank on each side frame adapts the side frame to function as an equalizer between the corresponding journal boxes. When different vertical forces applied to opposite ends of the side frame are greater than can be readily absorbed by the journal box springs, the side frames may tilt without affecting the normal position of the spring seat 17, spring 18, cap 19, and hangers 23. Because the load is supported at the sides of the truck, there is no need for a heavy, deep, transverse bolster, such as is used in the conventional truck, where the body is supported on a bolster center plate and the truck load is carried to the ends of the bolster and from the latter supported through a spring, spring plank, and swing hanger by the truck wheel piece. The construction eliminates the necessity for a heavy, rigid truck frame. The separate load carrying parts and the connecting links and anchors 28, 28a, 35 provide all the necessary support and, at the same time, afford the desirable springing and lateral motion characteristics present in the conventional, heavy passenger car truck arrangements. Any lubrication problem inherent in fully loaded side bearings is eliminated.

Preferably, a snubber 50 at each side of the truck is connected at its opposite ends to cap 19 and to spring plank seat 17 to control oscillations of springs 18.

It is to be understood that the construction of trucks 1 and 3 is the same as that of truck 2, but the lower ends of all of their hangers 23 are connected to the underframe of one car. The spring plank bumpers 46 will be opposite to body underframe elements corresponding to coupler tongue pads 48.

The second form of the truck shown in Figure 7 corresponds to that previously described, but the body supporting hangers 60 are suspended from caps 61 on air springs 62 and the transverse spring plank 63 is, in effect, a part of the spring system since it forms a pair of hollow air chambers each communicating with the spring at one side of the truck. Links 64 and 69 anchor the spring caps against movement transversely and longitudinally to the spring plank brackets 65 and hold the spring caps of the truck relative to the spring plank. Bumpers 66 are shown opposed to the body center sill structure 67, as in the truck previously described. The body brackets 68, supported by the lower ends of hangers 60, are as previously described.

The third form of the invention shown in Figures 8, 9, 10 resembles the forms previously described but supports a single vehicle body through its brackets 70 by swing hangers 71 suspended from the truck outboard of the truck wheels. The truck differs from the previously described forms in utilizing separate equalizers and equalizer springs similar to conventional passenger train trucks. Drop equalizers 72 extend between the axle journal boxes 73 and carry equalizer springs 74 near the ends of the lower portions of the equalizers. The truck frame includes pedestals 75, slidably receiving the journal boxes, wheel pieces 76 mounted on springs 74, and a central transverse member 77 which may be integral with wheel pieces 76 to form a rigid truck frame.

Air springs 78, spaced apart lengthwise of the truck, are seated on brackets 79 projecting from the frame wheel pieces. A transom 80 extends transversely of the truck with its ends bifurcated at 81 and resting on air springs 78 and holds these springs in spaced relation to each other. Hangers 71 are suspended from the ends of transom elements 81 and each is formed similarly to the anchors previously described and includes a central rod 82, rubber pads 83, compressed by washers 84, positioned between nuts 85 on the ends of the rod, and a shorter tube 86 between the inner washers.

Transom 80 has a centering connection 88 to the car body about which the truck and body swivel but which does not carry any vertical load. The body and transom move transversely of the truck frame when subject to lateral shocks, but such movement is yieldingly resisted by air springs 90, compressed between bolster frame upright brackets 91 and transom upright brackets 92, and return the transoms, car body, and truck to normal position when the force of the shock is expended.

Anchors 93, similar to those previously described, extend lengthwise of the truck with their ends secured to brackets 94 on the truck frame and brackets 95 on the transom. These anchors hold the truck frame against substantial movement relative to the transom and body lengthwise of the structure.

Hangers 71 and anchors 93 yield to accommodate relative lateral and vertical swiveling movements of the truck and body while holding them against undesirable relative movements.

The fourth form of the invention shown in Figures 11, 12, and 13 combines some of the features shown separately in the first and third forms. Drop equalizers 100 are supported at their ends on journal boxes 101 and carry springs 102 which, in turn, support the truck frame comprising pedestals 103, wheel pieces 104, an integral transverse member 105, and integral spring seats 106, mounting springs 107, all as shown in Figures 8, 9, and 10. Springs 107 have caps 108, each of which has swing hangers 109 suspended from its opposite ends and pivotally connected to car body brackets 110, which may be on separate cars coupled similarly to the arrangements of Figures 1–5 or may be on a single car underframe as in Figure 8. With either type of body connection, the structure of this form embodies a rigid truck frame spring-supported on elongated equalizers and mounting a single spring at each side of the car provided with swing link suspension to the sides of the car body. All lateral movement between the spring cap and car body is by virtue of the swinging of hangers 109. The only other connection between the car body and truck frame is through a longitudinal anchor 111 at the longitudinal center of the structure, which anchor 111 does not interfere with the lateral or swiveling movements of the body and truck, but restricts their relative longitudinal movement. Spring caps 108 are held against all but relative vertical movements by V-shaped links 112 and longitudinal links 113.

The fifth form of the invention shown in Figures 14, 15, and 16 is like that of the third form, with drop equalizers 120 between journal boxes 121 and carrying springs 122 supporting the truck frame wheel pieces 123 connected by a rigid transverse member 124. A single bracket 125 on each wheel piece seats a spring 126 on which one end of a transverse floating transom 127 is mounted. In this form of the invention, the transom has no center pin swivel connection to the car body, but the truck is shown as supporting the adjacent ends of two car bodies, as shown in Figure 1, having underframe end members 130 and 131 provided with projecting tongues 132 and 133, respectively. These tongues are connected by a clevis 134 similar to that shown in Figures 2–5 provided with a vertical pivot pin 135.

Truck floating transom 127 is connected by a transverse anchor 136 to a U-bolt 137 embracing tongue 133 and pivoted to tongue 133 and clevis 134 by pin 135. The transom is connected to the truck frame wheel pieces 123 by side longitudinal anchors 138. A central longitudinal anchor 139 connects the truck frame transverse member 124 to a bracket 140 on the end frame member 131 of the right hand car body and holds the truck, including its transom 127, against movement lengthwise of the coupled car bodies but cooperates with transverse anchor 136 to accommodate swiveling of the truck and bodies about clevis pivot pin 135.

In each form of the invention, the car body underframe is recessed to receive the suspension links, springs, and spring caps and is directly suspended therefrom at the sides of the truck. The heavy truck bolster present in conventional truck structure is avoided. Full flexibility necessary for lateral motion, swiveling trucks and any desirable spring action is retained.

The details of the structure may be varied substantially in other ways than those described above without departing from the spirit of the invention and the exclusive use of those modifications coming within the scope of the claims is contemplated.

What is claimed is:

1. In a railway vehicle truck, spaced wheeled axles, truck framing including longitudinal side members extending between and supported from said axles and a transverse member extending between and connecting said side members and positively holding them in spaced relation, the truck framing being spring-supported from the wheeled axles, springs at the sides of the truck and supported from the truck framing, hangers suspended from said springs, pivot supports for vehicle body structure on the lower ends of said hangers, the middle portion of the truck transverse member being at a lower level than said framing supporting springs, and means for pivotally connecting the middle portion of the transverse member to a vehicle body mounted on the truck.

2. A railway vehicle truck according to claim 1 in which the hangers swing transversely and longitudinally of the truck.

3. A railway vehicle truck according to claim 1 in which there are equalizers extending between the spaced axles and the truck frame is spring-supported on the equalizers at points spaced apart longitudinally of the equalizers.

4. A railway vehicle truck according to claim 1 in which there are elongated equalizers extending between and carried by the spaced axles and the truck frame is spring-supported from longitudinally spaced points on each equalizer, and the vehicle body supporting elements are between the springs on the equalizers and above the level of the equalizers.

5. A railway vehicle truck according to claim 1 which includes linkage between and connected to the truck frame and the upper portions of the springs mounted thereon holding the latter and the upper ends of the hangers suspended therefrom against movement transversely of the truck frame.

6. A railway truck according to claim 1 in which the hanger supporting springs comprise distortable air chambers, there being means holding the hanger supporting portions of said chambers against distortion transversely of the truck.

7. A railway truck according to claim 1 in which the hanger supporting springs comprise vertically distortable air chambers, there being other air chambers positioned between the truck frame and the hanger supporting portions of the first mentioned air chambers and yieldingly resisting relative movement of said portions transversely of the truck.

8. A railway vehicle truck according to claim 1 which includes links extending respectively transversely and lengthwise of the truck between and connected to the truck frame and the upper portions of the springs mounted thereon respectively holding the latter and the upper ends of the hangers suspended therefrom against movement longitudinally and transversely of the truck frame.

9. A railway truck according to claim 1 in which the hanger supporting springs comprise distortable air chambers, there being means holding the hanger supporting portions of said chambers against distortion longitudinally and transversely of the truck.

10. A railway vehicle truck according to claim 1 in which the middle portion of the transverse member is below the level of its end portions and an intermediate cross transom is carried at its ends on the springs at the sides of the truck and has a relatively lower level middle portion of inverted channel cross section receiving said frame cross member between its channel flanges and the hangers are suspended from the ends of said intermediate transverse member.

11. A railway vehicle truck according to claim 1 in which the springs at the sides of the truck include springs at each side spaced apart lengthwise of the truck and the hangers suspended from said springs comprise a single hanger at each end of the transverse member intermediate the corresponding springs.

12. A railway vehicle truck according to claim 11 in which the truck frame is mounted on equalizers extended between the spaced wheeled axles and frame supporting springs are spaced apart lengthwise of each equalizer.

13. A railway vehicle truck according to claim 12 in which the springs mounted at each end of the transverse member are provided with rigid caps, anchors extending transversely of the truck and pivotally connected at one end to one of said caps and to the transverse member to position the caps transversely of the truck and the body supporting hangers are pivotally suspended from said caps.

14. A railway vehicle truck according to claim 13 in which there is a bearing at the middle of the transverse member provided with an upright pivot pin for connection to a vehicle body.

15. In a railway vehicle structure, a truck having spaced wheeled axles and a transom member extending transversely of the truck intermediate said axles, the end parts of the transom member being spring supported from the wheeled axles and the intermediate part of the transom member being at a lower level than its end parts, springs carried on the end parts of the transom member, there being hangers suspended from said latter-mentioned springs, and vehicle body underframing having pivotal supporting connections at its sides to the lower ends of said hangers, the middle of the vehicle body underframing being at a lower level than the upper portions of said latter-mentioned springs and the vehicle body underframing extending from its middle over and freely clearing the end parts of said transom member and the springs carried thereon.

16. Structure according to claim 15 in which the hanger support at each side of the truck comprises a cap mounted on the corresponding springs, there being anchor-like devices extending transversely of the truck and pivotally connected at their ends to respective caps and to the transom member to space the caps and the supper ends of the hangers at opposite sides of the truck from each other.

17. Structure according to claim 15 in which equalizers at opposite sides of the truck extend between the wheeled axles and the spring support for each end of the transom comprises units spaced apart lengthwise of the equalizers, and each body supporting hanger is between corresponding units and is inclined downwardly and outwardly from its point of suspension and has its lower end outboard of the equalizer.

18. Structure according to claim 15, which includes an upright center pin swivel connection between the vehicle body underframing and the truck transom member at the middle of the truck.

19. A structure according to claim 15 in which the hanger support at each side of the truck comprises a cap mounted on the corresponding springs, there being elongated links extending transversely and longitudinally of the truck and connected at their opposite ends to respective caps and to the transom member to space the caps and upper ends of the hangers at opposite sides of the truck from each other and to position the caps longitudinally of the truck.

20. Structure according to claim 15 in which the vehicle body underframing comprises the end portions of two vehicle bodies each individually supported at each side of the truck by one of the hangers, there being individual tongues on said end portions projecting longitudinally toward and pivotally connected to each other for swiveling the bodies relative to each other and to the truck.

21. A structure according to claim 20 which includes a transversely extending member pivotally secured to the vehicle body underframing and elongated links each pivotally connected at its opposite ends to said transversely extending member and said transom, said links being at different levels to resist tilting of the transom about its longitudinal axis while accommodating transverse and swiveling movements of the truck relative to the body underframing.

22. In a railway vehicle structure, a truck including spaced wheeled axles and a truck frame supported thereon, a pair of elongated hangers pivotally supported by the truck frame at each side of the truck intermediate the wheeled axles, and vehicle body underframing comprising adjacent end portions of two pivotally connected vehicle bodies extending over said wheeled axles and each individually supported at each side of the truck by one of the hangers.

23. Structure according to claim 22 in which an elongated anchor extends lengthwise of the truck and at its ends has connections to the truck frame and to one of the bodies which yield transversely of the truck and bodies to accommodate relative transverse movements between said truck and said bodies while preventing relative longitudinal movement therebetween.

24. In a railway vehicle truck, wheeled axles, truck side frame members extending lengthwise of the truck and supported from said axles, a spring plank extending transversely of the truck intermediate the ends of the side members, the side members having pivot connections to the ends of said spring plank and tilting vertically relative thereto and to each other lengthwise of the truck, spring units on said spring plank for supporting the truck load, and means providing for, but yieldingly resisting, the tilting of the spring plank relative to the side members.

25. A railway vehicle truck according to claim 24 in which the pivotal connections between the side members and the spring plank comprise cylindrical parts, one surrounding the other, with a bushing of rubber-like material between the parts.

26. A railway vehicle truck, spaced axles, truck frame side members carried thereby and each having journal box engaging ends and a central portion comprising elements spaced apart transversely of the truck, at opposite sides of the center line of said journal box engaging ends, a spring plank extending transversely of the truck, and having pivotal mountings between each end portion of the spring plank and both of the adjacent spaced apart side frame elements to prevent angling of the spring plank relative to the side members, and vehicle body supporting elements on said spring plank.

27. A railway truck according to claim 26 in which each pivotal mounting consists of cylindrical parts, one surrounding the other, with a bushing of rubber-like material between the parts.

28. In a railway vehicle truck, wheeled axles spaced apart lengthwise of the truck, truck frame side members extending lengthwise of the truck, with upper portions above said axles and supported therefrom, the intermediate portions of the side members being below the level of the axles, a truck frame cross member extending transversely of the truck, the ends of the cross member having horizontal pivot mountings on the intermediate portions of the side member with the pivot axes extending transversely of the truck, spring seats on said cross members, springs mounted on said seats and extending upwardly above the level of the end portions of said side members, hangers suspended from the upper portions of said springs, and vehicle body supporting elements on the lower portions of said hangers below the level of said seats.

29. In a railway vehicle truck, wheeled axles, truck frame side members extending lengthwise of the truck and supported from said axles, a cross member extending transversely of the truck, the intermediate portions of the side members being below the level of the axles, the ends of the cross member extending over and beyond the intermediate portions of the side members and being supported by the latter and provided with spring seats outboard of the side members and above the level of the axles, springs mounted on said seats and extending upwardly and inwardly of the truck, hangers suspended from the upper portions of said springs, and vehicle body supporting elements on the lower portions of said hangers below the level of said seats and outboard of said side members.

30. In a railway vehicle truck, wheeled axles, a truck frame supported from said axles, a spring seat intermediate the ends of each side of the frame and pivoted to said frame to tilt relative to the frame, springs mounted on said seats, caps on said spring, hangers suspended from said caps at opposite sides of said springs, and vehicle body supporting elements on the lower portions of said hangers.

31. A railway vehicle truck, spaced axles, truck frame side members carried thereby and each having journal box engaging ends and a central portion comprising elements spaced apart transversely of the truck, at opposite sides of the center line of said journal box engaging ends, a spring plank extending transversely of the truck and journaled in said portions to pivot lengthwise of the truck, a spring unit mounted on each end of said spring plank, a cap on each spring unit with brackets projecting therefrom lengthwise of the truck, swing hangers suspended from said brackets, and vehicle body-supporting elements on said swing hangers.

32. In a railway vehicle structure, a truck having spaced wheeled axles and a frame supported on the axles and holding them parallel and spaced apart and including a transverse transom intermediate the axles, upright springs seated on said frame at the ends of the transom, hangers suspended from the upper ends of said springs to swing transversely and lengthwise of the vehicle, separate vehicle body underframes extending toward each other over individual truck axles of the truck, each underframe having at each side a depending bracket pivoted to the lower end of the corresponding hanger, the body underframe intermediate said brackets and hangers extending abreast of said springs and extending over said transom and having a pivotal connection to the other vehicle body underframe.

References Cited in the file of this patent

UNITED STATES PATENTS

| 267,335 | Driggs | Nov. 14, 1882 |
|---|---|---|
| 2,267,589 | Eksergian | Dec. 23, 1941 |
| 2,268,267 | Sheesley | Dec. 30, 1941 |
| 2,510,353 | Travilla | June 6, 1950 |
| 2,706,453 | Schneider | Apr. 19, 1955 |

FOREIGN PATENTS

| 4,433 | Great Britain | Dec. 22, 1875 |